United States Patent [19]  
Iguchi et al.

[11] 3,847,620  
[45] Nov. 12, 1974

[54] METHOD FOR PRODUCING SILVER HALIDE PHOTOGRAPHIC PHOTOSENSITIVE EMULSION

[75] Inventors: Shigeru Iguchi; Tetsuo Yano; Tamotu Iwata, all of Kyoto, Japan

[73] Assignee: Mitsubishi Paper Mills, Ltd., Tokyo, Japan

[22] Filed: Nov. 14, 1972

[21] Appl. No.: 306,382

[30] Foreign Application Priority Data  
Nov. 15, 1971 Japan.............................. 46-91337

[52] U.S. Cl..................................... 96/114, 117/34  
[51] Int. Cl............................................. G03c 1/72  
[58] Field of Search............... 96/114, 87 R; 117/34

[56] References Cited  
UNITED STATES PATENTS  
3,165,412  1/1965  Minsk et al........................... 96/114  
3,356,686  12/1967  Firestine et al...................... 96/114  
3,306,750  2/1967  Minsk et al........................... 96/114  
3,241,969  3/1966  Hart et al............................. 96/114

OTHER PUBLICATIONS

Photographische Korrespondenz, "The Use of Synthetic Plastics in Photo. Materials," Depauw, 1964, p. 21.

"Synthetic Polymers for Photo. Silver Halide Emulsions," Mem. Fac. Industr. Arts, V. 18, p. 123, Yano, 1969.

*Primary Examiner*—David Klein  
*Assistant Examiner*—Edward C. Kimlin  
*Attorney, Agent, or Firm*—Cushman, Darby & Cushman

[57] ABSTRACT

A silver halide photographic emulsion excellent in photographic characteristics, stability, etc. is prepared by using a copolymeric water soluble synthetic resin essentially consisting of a carboxylic acid group, an imidazole group and an acid amide group containing N(1,1-dimethyl-3-oxobutyl) aminocarbonyl group in place of gelatin.

3 Claims, No Drawings

METHOD FOR PRODUCING SILVER HALIDE PHOTOGRAPHIC PHOTOSENSITIVE EMULSION

The present invention relates to a method for producing a silver halide photographic lightsensitive emulsions using a copolymeric water soluble synthetic resin essentially consisting of a carboxylic acid group, imidazole group, and an acid amide group containing N(1,1-dimethyl-3-oxobutyl) aminocarbonyl group. Thus obtained emulsions are excellent in photographic characteristics, stability, etc.

Silver halide photographic emulsions are usually prepared by reacting a water-soluble silver salt and a water-soluble halide in an aqueous solution containing a colloid binder, usually gelatin. However, it is very difficult to obtain gelatins which have constant physical and photographic properties and most of these properties are deteriorated by bacterial decomposition during storage or hydrolysis during manufacturing operation. Several methods have been proposed to substitute gelatin with water soluble synthetic polymers containing aminocarbonyl group, carboxylic acid group, an imidazole group in the same molecule have the similar action on formation and growth of crystals or silver halide with that of gelatin. In this respect, see "Bulletin of Japan Photographic Society" (Vol. 29, page 22, 1966). Thus, said water soluble synthetic resins can be used for production of photographic silver halide lightsensitive materials. With use of said synthetic resins it is possible to produce photographic silver halide lightsensitive materials of constant quality more easily than with the conventionally used gelatin which is a natural product. Moreover, isoelectric point, inhibition action for growth of silver halide crystals, etc. can be freely adjusted by suitable choice of the proportion of carboxylic acid group and imidazole group.

However, the restraining properties of said synthetic resins for the growth of crystals varies depending upon whether the silver halide is silver chloride or bromide. That is, the synthetic resins which have the same restraining action for growth of crystals of silver chloride as the usual gelatin have smaller restraining action for growth of crystals of silver bromide. Therefore, when gelatin is substituted with such synthetic resins which yield the same particles of silver chloride emulsion as gelatin does, coarse particles of silver bromide emulsion are obtained. Increase of the content of imidazole group in said synthetic resins causes the same result for silver bromide emulsion as gelatin, but the restraining action for silver chloride emulsion becomes too strong and the particles become fine to lower the sensitivity.

The inventors have found that said synthetic resins into which the N(1,1-dimethyl-3-oxobutyl) aminocarbonyl group is introduced can increase restraining power for growth of silver bromide crystals and with use of said resins the restraining action for growth of silver chloride crystals and silver bromide crystals can freely be adjusted.

That is, according to the present invention, the restraining action for growth of crystals of silver chloride and silver bromide can be made the same as that of gelatin and furthermore it also becomes possible to attain restraining actions of desired degree for silver chloride and silver bromide, respectively.

Introduction of N(1,1-dimethyl-3-oxobutyl) aminocarbonyl group into the synthetic resins can be carried out by adding acyl N(1,1-dimethyl-3-oxobutyl) amide

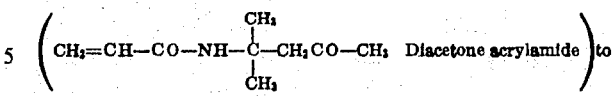

monomers prior to polymerization and then conducting polymerization in accordance with the usual method.

The hydrophilic monomers used for copolymerization with diacetone acylamide in the present invention are acid amide such as acrylamide or methacrylamide; carboxylic acid such as acrylic acid or methacrylic acid; and vinylimidazole derivatives having the general formula

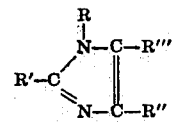

(wherein one of R, R', R" and R''' is vinyl group and the other are hydrogen, alkyl or hydroxyalkyl). For example, 1-vinyl-imidazole, 5-vinyl-imidazole, 1-vinyl-2-methylimidazole, 1-vinyl-2-ethyl-imidazole, 1-vinyl-2,4-dimethyl-limidazole, 1-vinyl-2-ethyl-4-methyl-imidazole, 1-vinyl-4(or 5) β-hydroxyethyl-imidazole, 1-vinyl-2-β-hydroxyethyl-imidazole, etc. may be used.

The essential structure of the water soluble synthetic resin in the present invention is as follows:

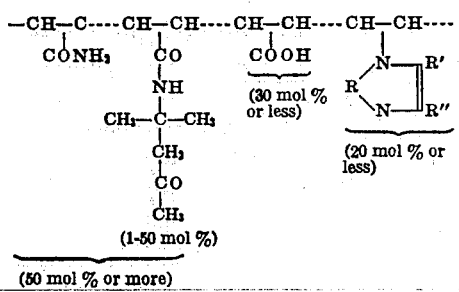

The proportion of each monomer in the synthetic resin necessary for providing standard speed of growth of silver halide particles is suitably vinylimidazle derivative 8 mol %, carboxylic acid such as acrylic acid or methacrylic acid 7 mol %, acid amide such as acrylamide or methacrylamide 65 mol % and diacetone acrylamide 20 mol %. However, when synthetic resins capable of strongly inhibiting the growth of silver chloride particles are desired, the imidazole group can be increased or the carboxylic acid group can be decreased. On the other hand, when synthetic resins capable of strongly restraining the growth of silver bromide particles are desired, the content of diacetone acrylamide can be increased. Thus, it becomes possible to utterly freely adjust the growth of silver halide particles. Even when acid amide, carboxylic acid, and vinylimidazole derivative are copolymerized with diacetone acrylamide, the selective restraining effect for growth of silver bromide particles is unchanged. Moreover, even if the kind of imidazole derivative varies, no difference is caused in the effect.

The amount of diacetone acrylamide in the synthetic resin can freely be chosen in an extremely wide range. However, for the purpose of the present invention, less than 1 mol % of diacetone acrylamide can attain substantially no effect. On the other hand, when the amount is more than about 50 mol %, the resin becomes insoluble in water and cannot be used for production of silver halide emulsion. The content of the vinylimidazole derivative is practically 20 mol % or less and when the content exceeds 20 mol %, the growth of silver halide particles is extremely inhibited and when less than 1 %, sufficient effect cannot be obtained. The content of carboxylic acid is preferably 30 mol % or less and more than about 0.2 mol % is prefered and the balance is the acid amide. The isoelectric point of the resin is mainly determined by the ratio of the carboxylic acid to vinylimidazole and when the ratio varies between 0.2 and 5, the isoelectric point changes from 8 to 4. The contents of these components may be increased or decreased depending upon the desired speed of growth of silver halide particles and isoelectric point.

The synthetic resins used in the present invention have markedly excellent properties in the production of emulsion as mentioned above. Aqueous solution of the resin does not have the ability to gel on cooling and hence it cannot be applied in the same manner as gelatin. Gelatin and the like materials having gelling ability are added to the emulsion and then the emulsion is applied in a thin layer to a support such as paper, film, etc., and thereafter the fluidity of the emulsion is lost by cooling or other means, or the emulsion viscosity of which is increased is applied by air knife or other means and then is rapidly cooled. Thus obtained light-sensitive material can be developed and fixed in the same manner as the usual silver halide lightsensitive materials. However, the speed of development-fixation is rapid and the development time can be shortened to several tenths that of the usual lightsensitive material. This is an important advantage especially in color development or rapid developing.

The synthetic resins used in the present invention may be added in the form of an aqueous solution during emulsification and/or ripening. The amount of the synthetic resins added may be less than that of gelatin which may be about 1/6 — 7 times that of silver halide.

The water soluble synthetic resins used in the present invention may be prepared in the following manner.
Preparation Example 1
The following two liquids were firstly prepared.

Liquid 1
| | | |
|---|---|---|
| Acrylamide | 43.1 | g |
| 1-vinyl-2-hydroxyethylimidazole | 12.4 | g |
| Acrylic acid | 4.3 | g |
| Diacetoneacrylamide | 42.8 | g |
| Isopropyl alcohol | 21 | g |
| Water | 75 | g |
| Total | 198 | g |

Nitric acid was added to the above liquid to adjust pH to 6 - 6.5.

Liquid 2
| | | |
|---|---|---|
| Potassium persulfate | 0.54 | g |
| Water | 198 | g |

To the liquid 2 into which nitrogen gas had been sufficiently allowed to pass and which was then kept at 70°C was dropped the liquid 1 over a period of 90 minutes while stirring. After completion of the addition, the liquid was maintained at 70°C for a further 30 minutes to complete polymerization and thereafter, 4 ml of 3 % methanol solution of dihydroxyethylaniline was added to conduct a treatment at 70°C for 30 minutes to decompose the residual potassium persulfate. Thus obtained aqueous solution of synthetic resin may be used or stored in the form of aqueous solution. When it is necessary to use the resin in a solid form, the resin solution is subjected to precipitation-purification with methanol in an amount about 10 times the amount of the resin solution to recover as a solid.

The compositions of thus obtained synthetic resin were amide group 60 mol %, diacetoneacrylamide group 25 mol %, imidazole 9 mol % and carboxylic acid group 6 mol %.

Preparation Example 2

In place of carrying out the copolymerization of the four monomers, copolymerization of the following three monomers with omission of acrylic acid was effected and thereafter a part of amide group was hydrolyzed to convert it into carboxylic acid group to obtain a similar synthetic resin.

Liquid 1
| | | |
|---|---|---|
| Acrylamide (99 %) | 51.4 | g |
| Diacetoneacrylamide (99 %) | 34.2 | g |
| 1-Vinyl-2-methyl-imidazole | 9.2 | g |
| Nitric acid (70 %) | 2.7 | g |
| Water | 68.2 | g |
| Isopropyl alcohol | 21 | g |

Liquid 2
| | | |
|---|---|---|
| Potassium persulfate | 0.54 | g |
| Water | 174 | g |

Sufficient nitrogen gas was passed through the liquid 2 and then to said liquid kept at 70°C was dropped the liquid 1 over a period of 90 minutes. Thereafter, the liquid was further kept at 70°C for 30 minutes.

Thereafter, 4 ml. of 3 % solution of N-dihydroxyethyl aniline was added to said liquid and then the liquid was kept at 70°C for further 30 minutes. Thus obtained synthetic resin solution can be used for production of emulsion, but the resin is hydrolyzed to introduce carboxylic acid group to adjust the isoelectric point and the speed of growth of silver halide particles. For this purpose, 45 ml of 10 % sodium hydroxide solution was added to said resin solution and the solution was heated at 70°C for 30 minutes. Thereafter, 10 ml. of 70 % nitric acid was added thereto and the solution was neutralized and then cooled. If necessary, as in Preparation Example 1, the synthetic resin solution can be added to methanol in an amount about 5 times that of the resin solution to precipitate and recover the resin.

About 8 mol % of the side chain of thus obtained polymer was imidazole group, about 7 mol % was carboxylic acid group, about 20 mol % was diacetoneacrylamide group and the remaining 65 mol % was acrylamide group.

The resins obtained in the Preparation Examples 1 and 2 had substantially the same inhibition action for growth of crystals of silver halide as the standard gelatin and can be utilized for production of photographic emulsions. The growth of crystals can be intensively restrained by increasing the content of vinylimidazole to obtain synthetic resin suitable for production of fine grain emulsion. On the other hand, when the content of vinylimidazole is decreased, growth of grains becomes easy.

Emulsions were prepared using the synthetic resins of Preparation Examples 1 and 2 as shown in the following Examples.

Example 1

| Liquid A (50°C) | Synthetic resin of Preparation Example 1 | 4 | g |
|---|---|---|---|
| | Water | 150 | g |
| | Citric acid | 1 | g |
| | 6N sodium hydroxide solution | 1 | g |
| Liquid B (50°C) | Silver nitrate | 10 | g |
| | Distilled water | 50 | g |
| | Lead nitrate (5 % aqueous solution) | 2 | g |
| Liquid C (38°C) | Sodium chloride | 4.5 | g |
| | Cadmium chloride | 2.5 | g |
| | Water | 50 | g |

Liquid B was added to liquid A while stirring within one minute and furthermore liquid C was added thereto. Thereafter, they were digested at 50°C for 35 minutes and 5 g of 1 % potassium iodide solution was added and digestion was continued for 20 minutes to obtain an emulsion for printing paper suitable for contact printing.

Nearly the same emulsion was obtained using the synthetic resin of Preparation Example 2 in place of the synthetic resin of Preparation Example 1.

Example 2

| Liquid A (60°C) | Synthetic resin of Preparation Example 2 | 4 | g |
|---|---|---|---|
| | Water | 150 | g |
| | Citric acid | 1 | g |
| | 6N sodium hydroxide | 1 | g |
| Liquid B (60°C) | Silver nitrate | 10 | g |
| | Distilled water | 50 | g |
| | Lead nitrate (5 % aqueous solution) | 2 | g |
| Liquid C (50°C) | Sodium chloride | 4.5 | g |
| | Potassium bromide | 3.5 | g |
| | Cadmium chloride (10 % aqueous solution) | 10 | g |
| | Water | 50 | g |

Liquid B was added to liquid A while stirring within 1 minute and furthermore liquid C was added thereto over a period of one minute. Thereafter, digestion was carried out at 60°C for 35 minutes and then the liquid was cooled to 40°C and 450 g of 40 % aqueous solution of sodium sulfate was added to precipitate emulsion. The precipitate removed from mother liquor by centrifugalization was added to 100 ml of water and dissolved at 60°C. Thereafter, to the resultant solution was added 5 ml of potassium iodide solution and 5 ml of 0.01 % sodium thiosulfate solution and digestion was carried out for 20 minutes to obtain a contrast emulsion having the similar sensitivity to that of chlorobromide printing emulsion used for enlargement.

Example 3

| Liquid A (40°C) | Synthetic resin of Preparation Example 2 | 20 | g |
|---|---|---|---|
| | Water | 600 | g |
| | Ammonium bromide | 63.5 | g |
| | Potassium iodide | 2 | g |
| Liquid B (27°C) | Silver nitrate | 100 | g |
| | 25 % ammonia water | about 80 ml (total amount) | |
| | Water was added to obtain 300 ml of liquid | | |

Liquid B was added to liquid A while stirring over a period of 30 seconds and digestion was carried out at 40°C for 45 minutes. The temperature of thus obtained emulsion was rapidly decreased to room temperature and sulfuric acid was added thereto to adjust pH to 4.

To the resultant emulsion was added 1500 g of 40 % magnesium sulfate to precipitate silver halide and resin and the useless halogen salt and ammonium salt were removed. 600 g of water was added to the precipitate and heated to 55°C to dissolve the precipitate. To the resultant emulsion were added 50 g of 0.02 % sodium thiosulfate solution and 100 g of 0.02 % aqueous solution of adenine and digestion was carried out at 55°C for 70 minutes to obtain silver iodobromide emulsion of high sensitivity.

| | | | |
|---|---|---|---|
| Example 4 | | The following liquids were prepared at 60°C. | |
| Liquid A | | Potassium bromide | 0.12 g |
| | | Resin of Preparation Example 1 | 2 g |
| | | Water | 90 g |
| Liquid B | | Potassium bromide | 0.6 g |
| | | Water | 5 g |
| Liquid C | | Silver nitrate | 0.85 g |
| | | Water | 5 g |
| Liquid D | | Potassium bromide | 70 g |
| | | Resin of Preparation Example 1 | 6 g |
| | | Water was added to obtain 0.15 l of liquid | |
| Liquid E | | Silver nitrate | 100 g |
| | | Water | 0.15 l |

Liquid B and liquid C were added to liquid A while vigorously stirring over a period of 30 seconds. Thereafter, liquid D and liquid E were added thereto over a period of 50 minutes.

Precipitation and other treatments were carried out in the same manner as in Example 2 to obtain fine grain and contrast emulsion.

The above emulsions obtained had constant properties and had photographic characteristics which are of less deviation than when gelatin was used. Moreover, change of the emulsion with lapse of time was less than that of gelatin emulsions and they were stable. Therefore, they can be stored for a long period of time and furthermore they can be left in a state of solution for a long time.

What is claimed is:

1. In a method for preparing photographic light sensitive silver halide emulsions, the improvement in said method of using in place of gelatin a water soluble synthetic resin of the structure consisting essentially of

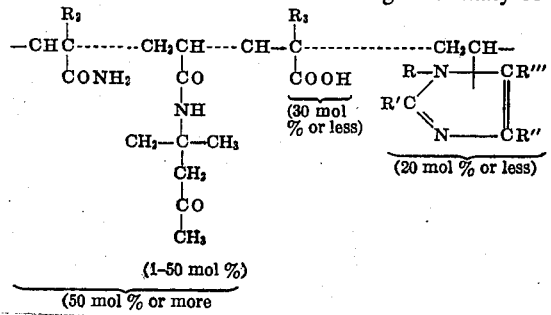

where:
  $R_2$ is H or methyl;
  $R_3$ is H or methyl where one of R, R′, R″ and R‴ is replaced by the bond attached to the

group and the remainder of R, R′, R″ and R‴ are hydrogen, alkyl or hydroxylalkyl.

2. A photographic light-sensitive silver halide emulsion containing the water soluble copolymeric synthetic resin as defined in claim 1.

3. A method according to claim 1, wherein the synthetic resin is added in the form of an aqueous solution during at least one of emulsification and ripening.

* * * * *